United States Patent Office 3,558,575
Patented Jan. 26, 1971

3,558,575
PROCESS FOR THE PRODUCTION OF COPOLY-
MERS FREE OF BLOCK POLYSTYRENE
Norman F. Keckler, Stow, Ohio, assignor to The Firestone
Tire & Rubber Company, Akron, Ohio, a corporation
of Ohio
Continuation of application Ser. No. 810,920, Mar. 24,
1969, which is a continuation of application Ser. No.
583,815, Oct. 3, 1966. This application Jan. 5, 1970,
Ser. No. 507
Int. Cl. C08f *19/08*
U.S. Cl. 260—83.7                                    1 Claim

ABSTRACT OF THE DISCLOSURE

Butadiene and styrene are copolymerized to produce a rubber using hydrocarbon lithium catalyst with a low percentage content of block styrene by carrying out the reaction at an elevated temperature and adding the monomers to the reaction mixture at such a rate that there is a substantial rise in the temperature adiabatically due to the heat of the reaction.

---

Figure 1:
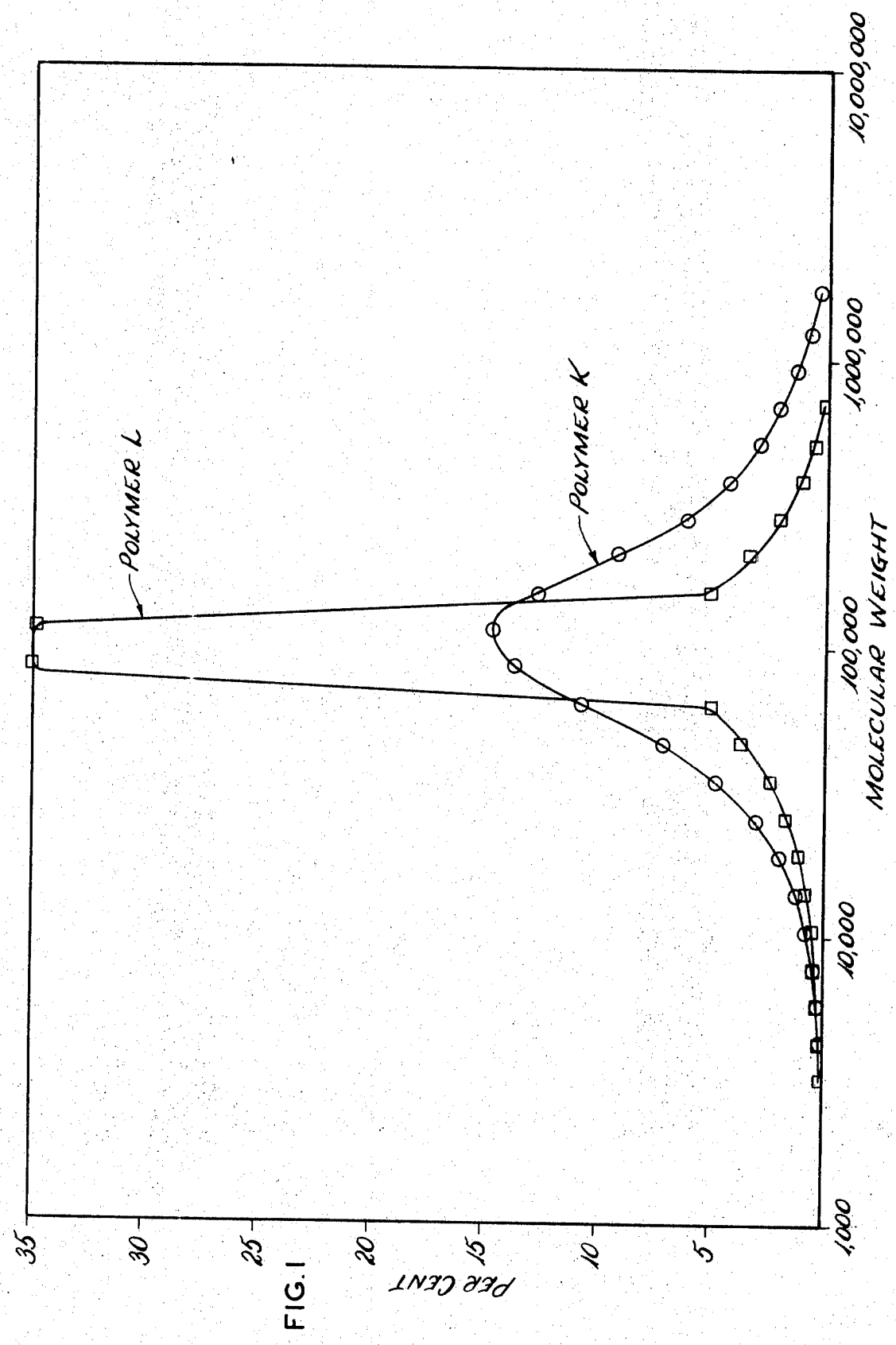

This application is a streamlined continuation of my application Ser. No. 810,920 filed Mar. 24, 1969, now abandoned which is a streamlined continuation of my application Ser. No. 583,815 filed Oct. 3, 1966 (now abandoned).

This invention relates to the process of preparing elastomeric copolymers of low non-elastomeric block polymer content from (1) butadiene and (2) a vinyl-substituted aromatic monomer namely, styrene, alpha-methyl styrene or a styrene derivative in which an alkyl group of 1 to 4 carbon atoms is substituted on the ring, or a mixture of these monomers.

The copolymerization of butadiene with styrene has been widely utilized for some time. Copolymers of the butadiene-styrene type have shown advantages over polybutadiene for tires in that they have better tread wear and a higher coefficient of friction on wet pavement. The most commonly used process for effecting the copolymerization has been by an emulsion technique utilizing a free-radical catalyst. The terms "polymer" and "copolymer" have been used interchangeably in the text.

More recently, considerable work has been done on the production of copolymers of such monomer mixtures in solution, utilizing a lithium-based catalyst, such as is disclosed in British Patent 817,693, the disclosure of which is incorporated herein by reference. Such copolymers of butadiene and styrene have been described in the patent literature. There it has been shown that the diene portion of the copolymer, derived from the butadiene, has a microstructure (as shown by infrared analysis) characterized by at least 23 percent cis-1,4-addition, and no more than 15 percent 1,2-addition.

It is known that the copolymers produced by the lithium-catalyzed copolymerization of butadiene and vinyl aromatic compounds such as styrene result in a block polymer, vis, block polystyrene. Whereas using a lithium-based catalyst the rate of polymerization of styrene alone is much more rapid than that of butadiene alone, when a mixture of the two monomers is copolymerized the relative rates of polymerization of the two monomers reverses so that the butadiene is substantially all polymerized during a period when only a small proportion of the styrene is polymerized. Thus, the natural result of copolymerizing a mixture of a conjugated diene such as 1,3-butadiene with a vinyl-substituted aromatic compound, such as styrene, under normal temperature conditions, is to produce block polystyrene by reason of the differential rate of polymerization of the monomers.

British 994,726 discloses a batch method of copolymerization requiring the presence in the reaction zone of a higher ratio of unreacted styrene than the ratio present in the polymer. It also discloses a continuous method which utilizes a series of reactors in which the faster reacting monomer is added to each reactor in order to obtain the desired monomer ratio.

It has been considered by those informed in the art that temperature has little or no effect on the relative reactivities of two monomers in polymerization reactions. It is surprising to find that in the copolymerization of butadiene and styrene in a lithium-based system this is not so as disclosed herein, particular attention being called to polymer No. 13 of Table VI-B.

According to this invention, there is provided a novel process of preparing copolymers from butadiene with styrene, alpha-methyl styrene or a styrene derivative in which an alkyl group of 1 to 4 carbon atoms is substituted on the ring. In this process, using increased polymerization temperatures which are in the range of 310 or 325° F. up to 500° F., a copolymer is produced which contains little or no block polymer even though there is present throughout substantially the whole of the polymerization a substantial amount of unreacted butadiene and styrene monomers. The copolymer produced contains substantially less non-elastomeric block polymer than when the polymerization is carried out at a lower temperature, such as 115° F., for instance. At such elevated temperatures the monomer reactivities have been favorably changed to minimize the formation of non-elastomeric block polymer.

Although it is possible to produce copolymers without block polystyrene by adding the monomers to the reaction at a rate equal to or slower than that at which they can be reacted, it is surprising that it is not necessary to react in the absence of unreacted monomer, and this is a decided advantage because of the careful continuous control of monomer required to maintain an absence of unreacted monomer. The process of the invention may be carried out on either a batch or a continuous basis. In batch operations, the temperature of the polymerization reaction mixture should peak at such a high temperature. (Peak temperature is defined as the maximum temperature obtained for the polymerization mixture during the process of active polymerization.) In continuous operations such a high temperature is maintained during a substantial portion of the process, and the monomers may be added continuously or incrementally in such quantity as to maintain a substantial amount of unreacted monomer present during essentially the whole of the reaction. This does not require careful operating control.

The polymerization process is carried out either in the presence of a liquid which is inert to the catalyst, or in the absence of such liquid, such as in a process involving bulk polymerization technique. Examples of solvents that may be used in this process are: benzene, toluene, cyclohexane, methyl cyclopentane; and the n-hydrocarbons, n-olefins and their isomers, such as butanes, hexanes, octanes, hexenes and decanes. It may be a solvent for the monomers only or for both the monomers and the product, or it may be a non-solvent in which one or more of the components is dispersed without dissolving. From 10 to 98 parts by weight of butadiene monomer is combined with 90 to 2 parts by weight of styrene or styrene derivatives, as mentioned previously. However, the preferred range of monomers to be combined is 75 to 95 parts by weight of butadiene and 25 to 5 parts by weight of styrene or styrene derivatives.

The copolymer produced according to this invention, in which there is no more than a minimum amount of block polystyrene, has certain advantages over the copolymers produced by other methods of polymerization in which large amounts of block polystyrene are obtained. The copolymers of this invention have a lower level of block polymer for a given styrene level than copolymers prepared at lower temperatures (115° F.) and have many advantages from this. A most important advantage is that whereas the presence of the block polymer in the vulcanizate of a tire tread, for example, produces internal friction which raises its running temperature, the uncured copolymers produced by the process of this invention contain substantially less block polymer with the result that their operating temperature is lower and tires and other products subjeced to repeated flexing and produced from the vulcanizate of the copolymer of this invention show less heat build-up in use and therefore have longer life. A further advantage is that the uncured new copolymers have a higher recovery value, and thus exhibit less cold flow.

In order to prevent heat build-up in a finished product from this copolymer if it is to be flexed during use, the amount of block polymer should not exceed 3 percent (based on the weight of the copolymer) and is preferably 2 percent or less. The amount of block polymer is not only dependent upon the temperature of polymerization but also upon whether the operation is a batch operation or a continuous operation. The process as described is applicable to continuous as well as batch polymerization.

The monomer reactivity of butadiene and styrene also changes favorably when ether-type compounds are incorporated in the lithium-based copolymerization system but unfortunately produces a higher 1,2-addition content and is accompanied by loss of elastomeric properties (J. Polymer Science, vol. 58, page 1181, 1962). The incorporation of trace amounts of ether-type compounds in combination with the specified elevated polymerization temperature may be used to also obtain copolymers of less block content and the retention of elastomeric copolymer properties.

In the drawings—

Figure 2:
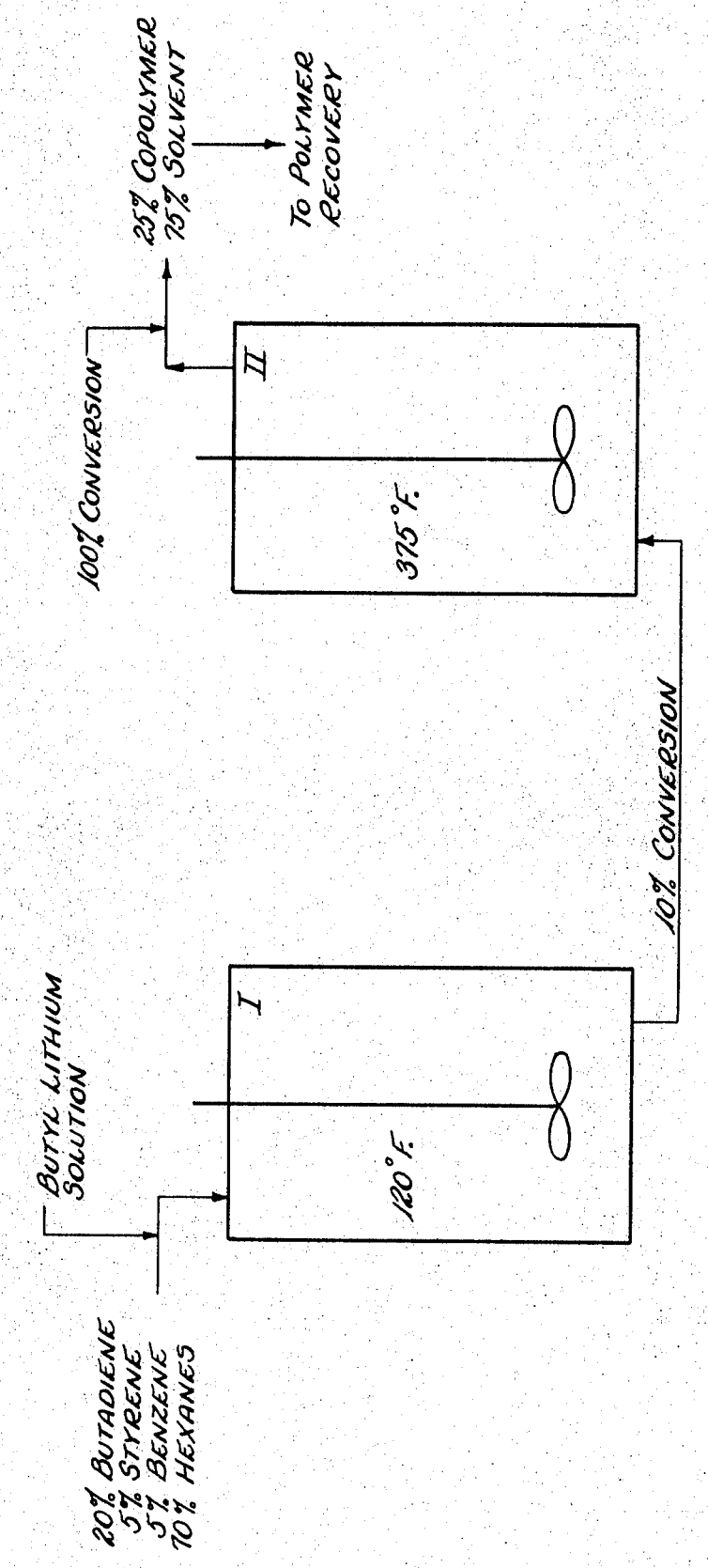

FIG. 1 shows molecular-weight distribution curves discussed in connection with Example 3; and FIG. 2 is a schematic flow sheet illustrating a continuous operation.

The invention is further illustrated by the following examples.

The improvement is found in vulcanizates of liquid copolymers, and in solid copolymers which may have a Mooney viscosity (ML/4/212° F.) ranging from 10 to 150.

There is evidence that polymer branching increases with an increase in the polymerization temperature as at comparable Mooney and bound-styrene values, DSV values decrease which is characteristic of branched polymers.

Butyllithium concentration ranges from 0.01 to 2.0 parts by weight, or preferably 0.05 to 1.75 parts by weight per 100 parts of monomer by weight, dependent upon the impurities in the monomer-solvent charge that are reactive to the lithium catalyst and to the desired molecular weight of the copolymer produced. Molecular weight of the copolymers may vary from semi-liquid (molecular weight as low as 2000) to very high molecular weight (50 Mooney viscosity after extending with equal parts of Dutrex 726). Copolymer molecular weight varies inversely with the amount of polymerization-active lithium catalyst and directly with conversion for a specified lithium/monomer ratio.

In all examples, 100 percent conversion of monomer to polymer was obtained and all copolymers were free of gel.

EXAMPLE 1

Example 1 shows the effect of polymerization temperature on the block polystyrene content of butadiene-styrene (90/10) copolymer prepared by the n-butyllithium catalyst system. Mixed hexanes were used as the diluent hydrocarbon. Polymerizations at 115° F. were carried out in glass bottles while stainless steel bombs were required for the 200° F. polymerizer. After loading the reacting vessels, they were placed in a constant temperature polymerizer and rotated end-over-end. The 115° F. polymerization was carried out for 16 hours as the reaction is slow and was well controlled. At higher bath temperatures, such as 200° F., the polymerization temperature cannot be controlled at the monomer concentration used and exceeds the constant-temperature bath. The polymers were separated from the hexane and after antioxidant was added, they were air-dried and then vacuum dried at 160° F. to isolate the copolymer.

TABLE I

| Polymer No. | A | C | D |
|---|---|---|---|
| Monomer concentration, percent | 22.0 | 22.0 | 33.3 |
| BuLi, gms./100 monomer | 0.093 | 0.070 | 0.120 |
| Polymerizer temperature, °F. | 115 | 200 | 200 |
| Peak temperatures, °F. [1] | 115 | 350 | 425 |
| Mooney (ML/4/212° F.) [2] | 37 | 41 | 30 |
| DSV [3] | 1.30 | 1.60 | 1.47 |
| Solution viscosity, centipoise [4] | 21.9 | 37.4 | 26.6 |
| Williams recovery, mm. [5] | 2.46 | 4.14 | 4.57 |
| Bound styrene, percent [6] | 10.2 | 10.0 | 10.6 |
| Block polystyrene, percent [7] | 6.7 | 2.1 | 1.5 |

[1] An adiabatic polymerization calculation in combination with experimental results.
[2] ASTM D927-57T.
[3] DSV stands for dilute solution viscosity. "Synthetic Rubber Facts", Firestone Synthetic Rubber and Latex Company, Section C7, page 30, Volume No. 1.
[4] 5% solution in styrene, Ostwald-Fenske viscometer.
[5] ASTM D926-56 (1961).
[6] ASTM D1416-56T.
[7] I. M. Kolthoff, T. S. Lee, C. W. Carr; Journal Polymer Science, Vol. I, page 429 (1946).

The tabulated results show the desirable decrease of block polystyrene content as the polymerization temperature is increased. Williams recovery values increase as the polymerization temperature is increased.

EXAMPLE 2

Example 2 shows a comparison of 90/10 and 85/15 butadiene styrene copolymers prepared as described in Example 1, using different peak temperatures as shown in the following table:

TABLE II

| Polymer No. | E | F | G | H |
|---|---|---|---|---|
| Butadiene/styrene ratio | 90/10 | 90/10 | 85/15 | 85/15 |
| BuLi, gms./100 monomer | .080 | .110 | .105 | .110 |
| Monomer concentration, percent | 21.5 | 21.5 | 22.2 | 22.2 |
| Peak temperatures, °F. | 115 | 350 | 115 | 350 |
| Mooney viscosity, (ML/4/212° F.) | 40 | 29 | 39 | 45 |
| DSV | 1.47 | 1.40 | 1.54 | 1.19 |
| Solution viscosity, centipoise | 28.9 | 36.0 | 18.3 | 18.1 |
| Williams recovery, mm | 2.03 | 3.40 | 2.06 | 4.3 |
| Bound styrene, percent | 10.1 | 10.1 | 14.8 | 14.6 |
| Block polystyrene, percent | 7.0 | 1.1 | 11.5 | 5.7 |

Increase in polymerization temperature shows a lowering of block polystyrene content. In the 85/15 copolymers, the block polystyrene content is greater than that desired for optimum elastomer properties although the polymerization at elevated temperature (Copolymer H) reduced the block polystyrene content in half when compared to the equivalent copolymer (Copolymer G) prepared at 115° F.

EXAMPLE 3

Polymers K and L were prepared in the same manner as the copolymers of Examples 1 and 2.

TABLE III-A

| Polymer No. | K | L |
|---|---|---|
| Butadiene/styrene ratio | 90/10 | 90/10 |
| BuLi, gms./100 monomer | 0.073 | 0.090 |
| Monomer concentration, percent | 20.6 | 20.6 |
| Polymerizer temperature, °F | 200 | 115 |
| Peak temperature, °F | 350 | 115 |
| Mooney viscoisty (ML/4/212° F.) | 35.0 | 35.0 |
| DSV | 1.29 | 1.53 |
| Solution viscosity, centipoise | 37.8 | 29.7 |
| Williams recovery, mm | 3.99 | 3.25 |
| Bound styrene, percent | 8.9 | 9.3 |
| Block polystyrene, percent | 1.5 | 6.2 |

At increased polymerization temperature, a copolymer of less block polystyrene content was produced. In general, at constant Mooney any styrene content, solution viscosities vary directly with the polymerization temperature and DSV values vary inversely with the polymerization temperature, as is evident from the above results. Observation of a polymerization mixture shows a significant decrease in viscosity when block polystyrene is formed and this is accompanied by an intense orange color which is due to the increased concentration of lithiated polystyryl anion.

TABLE III-B

Vulcanizates were prepared in the following test recipe:

|   | Parts |
|---|---|
| Polymer | 100 |
| HAF carbon black | 50 |
| Extending oil | 10 |
| Zinc oxide | 3.0 |
| Stearic acid | 2.0 |
| Sulfur | 1.75 |
| Santocure NS (N-t-butyl-2-benzothiazole-sulfenamide) | 0.8 |

The stocks were cured for 35 minutes at 293° F. and had the following properties:

TABLE III-C

| Polymer No. | K | L |
|---|---|---|
| Tensile strength, p.s.i | 2,325 | 2,100 |
| 300% modulus, p.s.i | 975 | 875 |
| Ultimate elongation, percent | 530 | 610 |
| Goodrich Flexometer* 1,800 r.p.m., 143 lbs., 10% deflection: | | |
| Temperature increase, °F | 50 | 57 |
| Percent set | 1.6 | 4.1 |

* ASTM D623-62, method A.

The vulcanizate of polymer L produced at the lower temperature shows the undesirable property of developing more heat in the flexing test. This is more pronounced in Table IX-C in which a more severe flexing test was used in determining running temperature. This heat build-up is associated with the increase of block polystyrene content. Also the percent set of polymer L is greater than that of polymer K and this, too, is an undesirable property which is related to block polystyrene content.

The graphs in FIG. 1 of the drawings show molecular weight distributions (MWD) obtained for copolymer K and L.[1] The high temperature polymerization for copolymer K produced a much wider MWD, while that for copolymer L is much narrower. Copolymer K contained fractions of polymer with a molecular weight approaching 2,000,000 while the highest molecular weight (MW) fraction for copolymer L was in the order of 750,000. Also copolymer K has a greater content of fractions of low molecular weight polymer as well as a greater content of fractions of very high molecular polymer. The heights of the MWD peaks of both copolymers coincide at approximately 100,000 MW, with copolymer L having a much higher peak. $M_w/M_n^2$ (heterogeneity index) ratios are a measure of MW heterogeneity and the greater the $M_w/M_n$ ratio the broader the molecular weight distribution. Properties relating to MW are listed below for the two copolymers.

TABLE III-D

| Polymer No. | K | L |
|---|---|---|
| $M_w$ | 154,828 | 93,557 |
| $M_n$ | 58,338 | 64,148 |
| $M_w/M_n$ | 2.65 | 1.46 |

Thus, high temperature polymerization produces a more heterogeneous copolymer which within reasonable limits produces vulcanizates of improved properties. The microstructure of polymer K, as determined by infrared analysis[3] is as follows:

|   | Percent |
|---|---|
| Cis-1,4 | 29.0 |
| Trans-1,4 | 49.1 |
| Trans-1,2 | 9.9 |
| Styrene | 11.9 |

EXAMPLE 4

Polymers M and N were prepared in agitator-equipped autoclaves, using mixed hexanes as the solvent. Polymer M is a blend of two polymers. The conditions of preparation and the properties of each polymer are given in the following table:

TABLE IV-A

| Polymer No. | M | N |
|---|---|---|
| Butadiene/styrene ratio | 90/10 | 90/10 |
| BuLi, gms./100 monomer | 0.073 | 0.085 |
| Monomer concentration, percent | 25.0, 25.8 | 20.2 |
| Initiation temperature, °F | 100 | 180 |
| Peak temperature, °F | 201, 220 | 350 |
| Time to reach peak temperature, minutes | (1) | 2.0 |
| Mooney viscosity, ML/4/212° F | 60, 50 | 45 |
| DSV | 1.44, 1.34 | 1.73 |
| Bound styrene, percent | 10.2, 10.2 | 8.3 |
| Block polystyrene, percent | 5.8, 5.4 | 1.9 |

[1] Controlled polymerization requiring in excess of four hours.

Again the effect of higher polymerization temperature in reducing block polystyrene formation is shown. Increased polymerization rates at elevated temperature are shown to approach adiabatic conditions, as only 2 minutes was required to reach the peak temperature after adding butyllithium to the reaction mixture which was at 180° F.

Table IV-B gives the microstructure of the butadiene fraction of each of the copolymers.

TABLE IV-B

| Polymer No. | M | N |
|---|---|---|
| Percent cis-1,4 | 36.6, 36 | 37.0 |
| Percent trans-1,4 | 55.0, 55.2 | 52.7 |
| Percent trans-1,2 | 8.4, 8.3 | 10.3 |

---

[1] These determinations were made with a Gel Permeation Chromatograph (GPC) manufactured by Waters Associates of Framingham, Mass. The method is described by Adams, Farhat and Johnson in Industrial and Engineering Chemistry (Product and Research Development Section), vol. V, page 126 (June 1966).

[2] $M_w$ and $M_n$ are discussed in the literature. (Billmeyer, Textbook of Polymer Science, Interscience Publishers, New York, 1962, pages 7, 66–67.)

[3] J. L. Binder, The application of infrared spectroscopy to Polymers, Particularly 1,3 Diene polymers: rubber Chemistry and Technology, vol. 35, page 57 (January–March 1962).

The properties of polymers obtained by identical cures of polymers M and N for 50 minutes at 293° F. are recorded below.

TABLE IV-C

| Polymer | M | N |
|---|---|---|
| Tensile strength, p.s.i. | 2,475 | 2,400 |
| 300% modulus, p.s.i. | 900 | 825 |
| Ultimate elongation, percent | 680 | 600 |
| Forced vibrator at 100° C.[1]: | | |
|   Dynamic modulus, p.s.i. | 269 | 239 |
|   Statis modulus, p.s.i. | 115 | 108 |
|   Internal friction (kps.) | 5.0 | 4.7 |
| Ring tear at 212° F., lbs./in.[2] | 232 | 262 |
| Shore A hardness: | | |
|   73° F.[3] | 63 | 62 |
|   212° F. | 42 | 53 |
| Steel ball rebound, percent: | | |
|   73° F.[4] | 66 | 68 |
|   212° F.[4] | 67 | 70 |
| Running temperature (° F.)[5] | 460 | 346 |

[1] J. H. Dillon, I. B. Freeman, G. L. Hall; Journal of Applied Physics, 15, 309 (1944).
[2] T. F. Lavery, F. A. Grover, S. Smith, L. J. Kitchen; Rubber Age, 80 843 (1957).
[3] ASTM D676–59T.
[4] O. D. Cole Transactions American Society Mechanical Engineers, 65, 115 (1943).
[5] Firestone Flexometer, ASTM D623–58 Method B; 250 pounds, 0.3 inch throw.

Room temperature stress-strain properties of polymer M are equivalent or better than those of polymer N. The thermoplastic properties of polymer M, due to its high block polystyrene content, are clearly revealed in the decline in Shore A Hardness values, measured at 212 and 73° F. Comparison of the running temperature of vulcanizate of polymer M and polymer N show clearly the inferiority of polymer M as the running temperature is over 100° F. higher. Thus, block polystyrene should be minimized for applications where constant flexing is encountered.

EXAMPLE 5

Copolymer O was prepared in the same manner as copolymer K but at a butadiene/styrene charge ratio of 98/2. Copolymer P (98/2 butadiene/styrene) was prepared at a polymerization schedule as follows: 1¼ hours at 15° F., 3½ hours at 122° F. and 7½ hours at 140° F. in order to have a controlled polymerization rate.

TABLE V

| Polymer No. | O | P |
|---|---|---|
| Butadiene/styrene ratio | 98/2 | 98/2 |
| BuLi, gms./100 monomer | 0.120 | 0.050 |
| Monomer concentration, percent | 21.7 | 22.8 |
| Polymerizer temperature, ° F. | 200 | 115–140 |
| Peak temperature, ° F. | 350 | 150 |
| Mooney viscosity | 52 | 28 |
| Williams recovery, mm. | 2.54 | 1.37 |
| Bound styrene, percent | 1.6 | 1.7 |
| Block polystyrene, percent | 0 | 0.48 |

Example 5 shows that block polystyrene formation is obtained with styrene charge ratios as low as 2 percent at low polymerization temperatures and is absent when polymerization is effected at the elevated temperature. The microstructure of copolymer O (determined by infrared analysis) was as follows: 37.9% cis-1,4, 50.1% trans-1,4, 10.6% trans-1,2, and 1.6% styrene.

EXAMPLE 6

Copolymers of low molecular weight which generally are above 2000 molecular weight are obtainable by the process. The following low-molecular weight copolymers were prepared with butyllithium concentration of 1.71 grams per 100 grams of monomer.

TABLE VI-A

| Polymer No. | 1 | 2 | 3 | 4 | 5 | 6 |
|---|---|---|---|---|---|---|
| Butadiene/styrene ratio | 60/40 | 70/30 | 80/20 | 60/40 | 70/30 | 80/20 |
| Monomer concentration, percent | 30.2 | 28.5 | 27.0 | 30.2 | 28.5 | 27.0 |
| Polymerizer temperature, ° F. | [1]105–140 | [1]105–140 | [1]105–140 | 200 | 200 | 200 |
| Block polystyrene, percent | 20.2 | 11.5 | 4.5 | 0 | 0 | 0 |
| Peak temperature, ° F. | <150 | <150 | <150 | >310 | >310 | >310 |

[1] Polymerization schedule: 2 ours at 105° F., 1½ hours at 140° F.

TABLE VI-A

| Polymer No. | 7 | 8 | 9 | 10 | 11 | 12 | 13 |
|---|---|---|---|---|---|---|---|
| Butadiene/styrene ratio | 80/20 | 70/30 | 60/40 | 50/50 | 80/20 | 60/40 | 50/50 |
| Monomer concentration, percent | 24.8 | 26.5 | 28.2 | 30.3 | 24.8 | 26.5 | 28.2 |
| Polymerizer temp., ° F. | [1]115–140 | [1]115–140 | [1]115–140 | [1]115–140 | 200 | 200 | 200 |
| Block polystyrene | 7.3 | 14.9 | 25.3 | 32.1 | 0 | 0 | 0 |
| Bound styrene, percent | 18.8 | 28.3 | 32.9 | 49.4 | 12.7 | 34.8 | 47.5 |
| DSV | 0.121 | 0.106 | 0.110 | 0.087 | 0.130 | 0.105 | 0.106 |
| Peak temperature, ° F. | <150 | <150 | <150 | <150 | >310 | >310 | >310 |

[1] Polymerization schedule: 1¼ hours at 115° F., 3½ hours at 122° F., 7½ hours at 140° F.

Monomers concentration increased with increasing styrene content as a 50/50 weight ratio of sytrene/benzene solution was used and the butadiene was a 25.0 percent (Table VI-A) or 22.8 percent (Table VI-B) solution with mixed hexanes. Results show that the liquid polymer of 50 percent styrene content (copolymer No. 13), prepared at high temperature, is free of block polystyrene as well as copolymers of less styrene content (polymer Nos. 4, 5, 6, 11 and 12) prepared at high temperature. All of the liquid copolymers prepared at low temperature (cocopolymers 1–3, 7–10) contained substantial amounts of block polystyrene. The molecular weight of these polymers is in excess of 4,000 molecular weight by stoichiometric calculation and is less than 10,000 molecular weight ($M_n$). Examples 1, 2, 3 and 4 of 90/10 butadiene/styrene copolymer show a definite tendency for the block polystyrene content to decrease as the Mooney viscosity is lowered, which is in agreement with the liquid copolymer results.

Similarly, liquid polymers can be produced in the absence of solvent inert to the catalyst, that is, by bulk polymerization.

This process applies to continuous as well as batchwise operations and combinations thereof. Continuous operation provides for the production of copolymers of less block polystyrene content than batchwise operation because of the more favorable kinetic conditions which prevail. An example of the continuous operation at elevated polymerization temperature is presented in the schematic diagram of FIG. 2 which illustrates a continuous polymerization train of two reactors. Continuous operation could be limited to one reactor or could be carried on in more than one reactor as shown in the drawing.

As can be seen from the data of examples, the copolymers of the invention show improved properties by reducing the block polystyrene content and are useful for tire tread compositions. These copolymers may also be blended with other elastomeric materials in formulating tire tread compositions. Thus, the copolymers may be blended with natural rubber, conventional SBR, high cis-polyisoprene, high cis-polybutadienes, ethylene-propylene rubbers, nitrile rubbers, chloroprene rubber, etc. The copolymers of the invention are eminently suitable either by themselves or in blends with other elastomers for extension with substantial amounts of plasticizers, as a plasticizing oil in conjunction with carbon black.

In addition to their use in tire treated compositions, the products of the invention may be blended with polystyrene, polypropylene, etc. to produce high impact materials suitable for molding and other uses. The products of the invention are also suitable for use in tire carcasses, in latexes, in adhesives and may be cast into films, molded, extruded, etc. as is known to those skilled in the plastics art to produce protective coatings (as a wire coating), tubing, filaments, dishes, toys and other products.

For use in tire tread stock, the stock may, for example, contain from about 40 to 200 parts by weight carbon black and from about 15 to 130 parts by weight of plasticizer for 100 parts total elastomer, the elastomer comprising one or more copolymers of the invention alone or in admixture with natural rubber, ethylene-propylene rubber, emulsion copolymer of butadiene and styrene, a polyisoprene having a cis-1,4 content of at least about 90 percent or a polybutadiene having a cis-1,4 content of at least about 30 percent and a 1,2-content not in excess of 12 percent. While any ratios of elastomers may be used, where a blend is desired it is preferred to have at least about 25 percent by weight of any one elastomer in the blend. The low molecular weight copolymers of this invention are useful for applications such as can coatings, adhesives and sealants. Also they are useful as the base polymer for adduct formation and their subsequent application.

The method of this invention produces polymers with a high content of live polymer, that is, polymer containing at least one lithium atom per molecule. Such live polymers are desirable for production of polymers containing functional groups and for coupling to produce branched polymers of higher molecular weight having improved processing properties. The polymerization may be carried out in solution, bulk, suspension or emulsion. Whichever method of polymerization is adopted it is essential that the materials present have no detrimental reaction destroying catalytic activity.

I claim:
1. The method of copolymerizing (1) butadiene monomer and (2) styrene monomer in the ratio of 50/50 to the ratio of 80/20, using butyllithium catalyst and producing a liquid copolymer with a molecular weight over 2000 which is free of styrene homopolymer, which process comprises copolymerizing the monomers in a batch operation, using an initial temperature of 200° F. and using a sufficiently concentrated solution to produce an exothermic reaction which reaches a peak temperature of over 310° F. while having present a substantial amount of butadiene and styrene during essentially all of the polymer reaction.

References Cited
UNITED STATES PATENTS

| | | | |
|---|---|---|---|
| 2,975,160 | 3/1964 | Zelinski | 260—83.7 |
| 3,094,512 | 6/1963 | Short | 260—83.7 |
| 3,198,774 | 8/1965 | Hyrtable et al. | 260—83.7 |
| 3,294,768 | 12/1966 | Wofford | 260—83.7 |

JAMES A. SEIDLECK, Primary Examiner

U.S. Cl. X.R.

260—33.6, 41.5, 79.5

PO-1050
(5/69)

UNITED STATES PATENT OFFICE
CERTIFICATE OF CORRECTION

Patent No. 3,558,575     Dated January 26, 1971

Inventor(s)    Norman F. Keckler

It is certified that error appears in the above-identified patent and that said Letters Patent are hereby corrected as shown below:

Col. 1, line 60, "vis" should read --viz--

Col. 5, line 15, "any" should read --and--
       line 56, "IX-C" should read --IV-C--

Col. 6, line 28, "Trans-1,2" should-read --1,2--
       line 69, "Percent trans-1,2" should read --Percent 1

Col. 7, line 53, "15° F." should read --115° F.--
       line 71, "10.6% trans-1,2," should read --10.6% 1,2, Col. 8, approximately at line 10, "2 ours at 105° F." should read --2 hours at 105° F.--
       approximately at line 15, under Polymer No. 10, "49.4" should read --49.2-- line 18, "Monomers" should read --Monomer--
       line 22, "polymer" should read --copolymer--
       line 64, "treated" should read --tread--

Col. 9, line 4, "an" was omitted before "emulsion"

Signed and sealed this 3rd day of August 1971.

(SEAL)
Attest:

EDWARD M. FLETCHER, JR.
Attesting Officer

WILLIAM E. SCHUYLER, JR.
Commissioner of Patents